(No Model.)  2 Sheets—Sheet 1.

C. A. BROUGHTON.
MACHINE FOR FORMING SPOOL BLANKS.

No. 401,997. Patented Apr. 23, 1889.

WITNESSES.
J. Henry Taylor.
E. B. Tomlinson

INVENTOR.
Charles A. Broughton
by Alex. P. Browne,
attorney (No Model.) 2 Sheets—Sheet 2.

C. A. BROUGHTON.
MACHINE FOR FORMING SPOOL BLANKS.

No. 401,997. Patented Apr. 23, 1889.

Witnesses.
J. Henry Taylor.
E. B. Tomlinson.

Inventor.
Charles A. Broughton
by Alex. P. Browne,
attorney.

UNITED STATES PATENT OFFICE.

CHARLES A. BROUGHTON, OF CONWAY, NEW HAMPSHIRE.

MACHINE FOR FORMING SPOOL-BLANKS.

SPECIFICATION forming part of Letters Patent No. 401,997, dated April 23, 1889.

Application filed December 16, 1886. Serial No. 221,744. (No model.)

*To all whom it may concern:*

Be it known that I, CHARLES A. BROUGHTON, of Conway, in the county of Carroll and State of New Hampshire, a citizen of the United States, have invented certain new and useful Improvements in Machines for Forming Spool-Blanks, of which the following is a specification.

My invention relates to machines for producing spool-blanks from stock of substantially the thickness of the length of the blank and of an area sufficient to furnish one or more blanks, but usually more than one, from the same piece of stock.

The object of my present invention is to improve the simplicity and efficiency of such machines.

Figure 1:
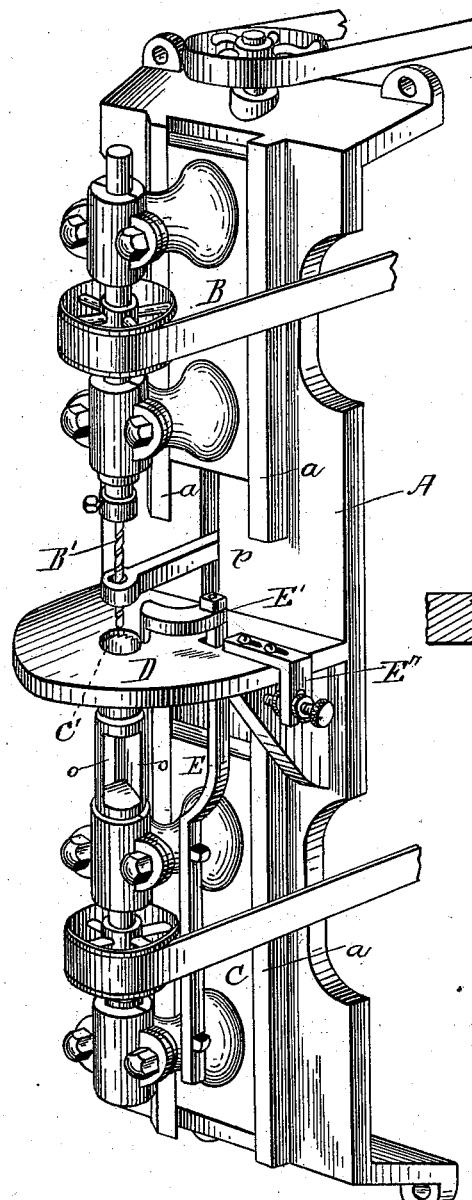
Figure 2:
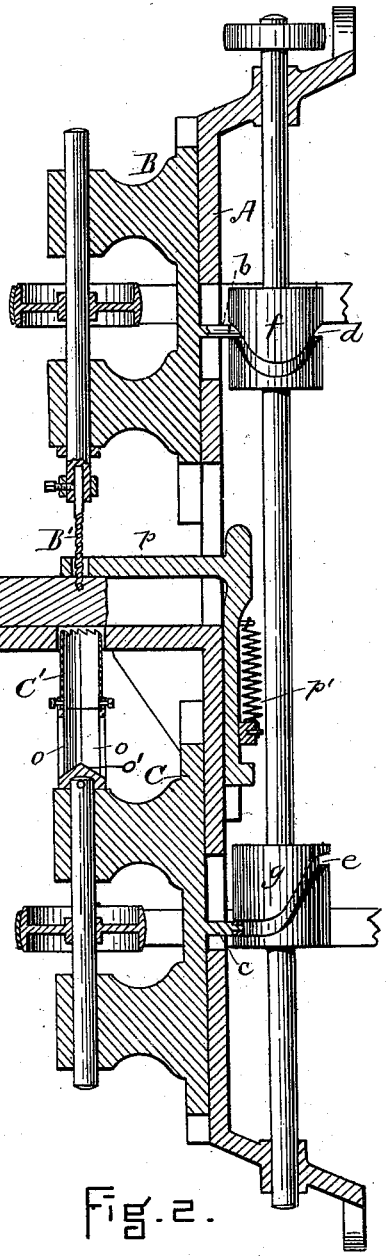
Figures 3, 4, 5:
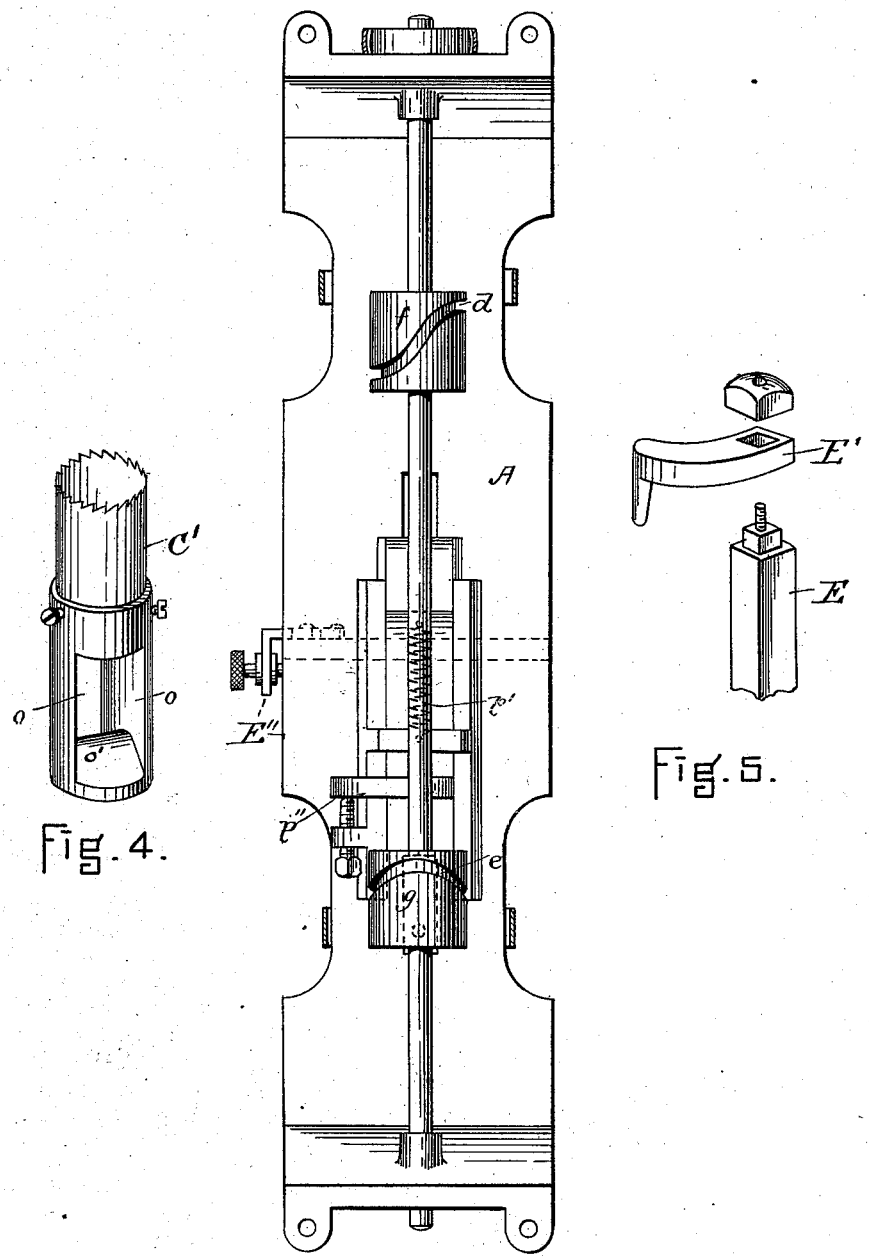

In the accompanying drawings, Figure 1 is a vertical perspective view of a machine embodying my present improvements in the form now best known to me. Fig. 2 is a vertical section of the same in the line of the cutting and boring tools. Fig. 3 is a back view of the same; and Figs. 4 and 5 are details of portions of the mechanism, as will be hereinafter more fully explained.

In the drawings, A represents the back frame of the machine, which in practice is secured vertically to any suitable standard or support. Upon this frame are formed guides or ways $a$ $a$, within which carriages B C, for the boring-tool and saw, respectively, are adapted to slide vertically. The uppermost carriage, B, supports and carries the pulley and mandrel by which the boring-tool B' is rotated, and the carriage C in a similar manner supports and carries the pulley and mandrel by which the circular saw or cutter C' is rotated. The boring-tool B' and saw C' are each connected to its operating-mandrel by means of a suitable chuck, adjustable to receive various sizes of such tools.

Between the carriages above mentioned I provide a suitable bed or table, D, upon which the stock is laid when the machine is operated.

I obtain the motion of the carriage toward or away from the stock which is placed between them by means of a stud, $b$ $c$, projecting rearwardly through a suitable slot in the frame A and entering the groove $d$ $e$ upon a suitable cam-wheel, $f$ $g$, driven by a suitable shaft and pulley in the ordinary manner.

It is obvious that at that time in the operation of the machine when it becomes necessary to move or advance the stock for cutting out a fresh blank both of the tools B' and C' should be sufficiently withdrawn to permit of this being done. I have, however, found it desirable in practice to so form and time the cams $d$ $e$ that, in the operation of producing a blank, the tool B' shall enter the stock downwardly slightly in advance of the saw C', which enters the stock upwardly. In this way the tool B' operates to steady the stock when the saw C' commences its work. After that the two tools may proceed through the stock at equal rates, except that toward the end of the operation it is desirable that the tool B' should have completed its work and be withdrawn from the blank (its cam-groove $d$ being properly formed and timed for this purpose) shortly before the saw C' has passed entirely through the stock and severed the blank.

As the saw C' exerts a slight upward pressure upon the stock when moving upwardly through it to cut out the blank from it, it is desirable to have an abutment over the stock and substantially central with the saw, by means of which abutment the stock will be prevented from rising under the upward thrust of the saw above mentioned, when the latter is working normally. As the stock to be cut in the machine varies in thickness, it is desirable to provide means for vertically adjusting the height of this abutment above the table, so that the distance between it and the table shall substantially correspond with the thickness of the stock that may be worked upon, the distance mentioned being in practice made just sufficient to enable the stock to be introduced without difficulty between the table and the abutment. Furthermore, as it sometimes happens that the saw in performing its work strikes a knot or imperfection in the stock, which greatly increases the friction and hence the tendency of the stock to be carried upward by the saw, it is desirable that the abutment should be provided with a spring attachment or cushion which will allow it to rise under the upward pressure of the stock whenever the friction becomes excessive, as above mentioned, and in this way reduce the liability of breaking the saw.

To accomplish these results I provide the machine with a yielding stop or abutment, $p$, adapted to slide up and down upon the vertical frame A of the machine, and connected to the frame by means of a spring, $p'$. To regulate the motion of the abutment or stop $p$ downwardly or toward the table, I provide an adjustable check, $p^2$, on the back of the frame. (Best seen in Fig. 3.) This adjustable check bears against the lower portion of the stop $p$ on the back of the machine and arrests its further descent, and hence, by adjusting the check $p^2$ on the back of the machine I can regulate the height of the stop or abutment $p$ above the table to correspond with the thickness of the stock to be worked upon. On the other hand, the spring $p'$, (best seen at Fig. 2,) which connects the stop $p$ with the frame of the machine, allows the stock to yield or move upwardly when undue upward pressure is brought against it, as before described.

To permit the escape of the spool-blanks when cut, I form apertures $o$ in the rear of the saw C' and immediately above a stop, $o'$, which operates to arrest the vertical descent of the falling blanks and to tip them sidewise through one of the said apertures out of and clear from the machine.

The particular form of deflecting-stop shown in the drawings—viz., that of a ridge or inverted V—I prefer to employ, on account of its simplicity and efficiency; but any other form of deflecting-stop may be substituted for this particular form which will accomplish the same result in substantially the same way. I also provide a gage against which the stock may be held to determine its position relative to the cutting and boring tools. This gage is supported on and moves vertically with the carriage C of the saw, and consists of a spring-arm, E, provided with a removable gage-piece, E', the inner end of which, or that portion which bears against the edge of the stock, I prefer to form with a downward extension or abutment portion. The gage-piece E', I make removable to permit of the use of different gage-pieces for different sizes of the blank, and the spring-arm is so constructed as to allow for a slight adjustment of each gage-piece toward or away from the stock by means of a gage-block, E'', (best seen at Figs. 1 and 3,) adapted to be moved in and out upon the upper surface of the table D by means of an adjusting-screw, as shown. The position of this gage-block is intended to regulate the amount of motion outwardly of the spring-arm E. To further facilitate this adjustment of the spring-arm E toward or away from the stock, I slot the table D where the spring-arm E passes through it, the slot running in the direction of the to-and-fro movement of the spring-arm E in the act of adjusting it.

In the operation of the machine the stock is fed over the table by the operator each time up to the gage, so as to present new stock in the place of the stock just formed, the operation being continued until the stock is exhausted.

I claim—

1. In a machine for forming cylindrical perforated blanks, the combination, with a horizontal table for supporting the stock from which the blanks are to be cut, of a hollow saw operating upwardly through the table and adapted to cut or saw the said blank from the stock, an abutment or stop above the stock provided with an adjustment for regulating the lowest position of the said abutment above the table, and a spring for permitting the said abutment to move upwardly under the excessive upward pressure upon the stock, substantially as set forth.

2. In a machine for forming spool-blanks, the combination, with the saw C' and its operating devices, substantially as set forth, of a gage against which the stock may be held to determine its lateral position, this gage consisting of a spring-arm, E, provided with a removable gage-piece, E', the said spring-arm being mounted upon the carriage which moves the saw, all substantially as set forth.

3. In a machine for forming spool-blanks, the combination, with the saw C' and its operating devices, substantially as set forth, of the spring-arm E, mounted upon the carriage which moves the saw, and provided with a removable gage-piece, E', and a gage-block, E'', for regulating the amount of motion outwardly of the spring-arm, the said gage-block being provided with an adjusting-screw whereby it may be moved in or out over the table D, all substantially as set forth.

In testimony whereof I have hereunto subscribed my name this 4th day of December, A. D. 1886.

CHARLES A. BROUGHTON.

Witnesses:
 H. P. WILDER,
 B. F. CLARK.